(12) United States Patent
Tjølsen et al.

(10) Patent No.: US 7,837,636 B2
(45) Date of Patent: Nov. 23, 2010

(54) TRANSMISSION DEVICE AND CHEST COMPRESSION DEVICE USING SAME

(75) Inventors: Øyvind Tjølsen, Stavanger (NO); Viggo Lauritz Norum, Kongsberg (NO); Karl Patrik Mandelin, Drøbak (NO)

(73) Assignee: Laerdal Medical AS, Stavanger (NO)

( * ) Notice: Subject to any disclaimer, the term of this patent is extended or adjusted under 35 U.S.C. 154(b) by 1061 days.

(21) Appl. No.: 11/585,674

(22) Filed: Oct. 23, 2006

(65) Prior Publication Data

US 2008/0092677 A1  Apr. 24, 2008

(51) Int. Cl.
*A61H 31/00* (2006.01)
(52) U.S. Cl. .................................. 601/41; 601/43; 74/23
(58) Field of Classification Search ............... 601/41, 601/42, 43, 44, 84, 85, 86, 87, 97, 98, 101, 601/107, 108, 110; 74/23, 25
See application file for complete search history.

(56) References Cited

U.S. PATENT DOCUMENTS 3,489,140 A   1/1970  Mullikin ................. 128/51
4,632,094 A   12/1986 Thomas ................... 128/52
5,327,887 A * 7/1994  Nowakowski ............ 601/41
6,290,660 B1 * 9/2001 Epps et al. ................ 601/41

FOREIGN PATENT DOCUMENTS

DE   9116002   2/1992
DE   4133637   4/1993

* cited by examiner

*Primary Examiner*—Quang D Thanh
(74) *Attorney, Agent, or Firm*—Dorsey & Whitney LLP

(57) ABSTRACT

A transmission device transforms an alternate rotational movement of an alternately rotating element into a linear reciprocating movement. The device includes a linear reciprocating element connected to the rotating element, and a first pivoting element having a first fixed pivot point connected to the linear reciprocating element. The transmission device includes a second pivoting element connected to the first pivoting element. A ball member, which may be connected to a CPR piston, is attached to the second pivoting element. A third pivoting element having a second fixed pivot point is connected to the second pivoting element.

29 Claims, 7 Drawing Sheets

TRANSMISSION DEVICE AND CHEST COMPRESSION DEVICE USING SAME

TECHNICAL FIELD

The present invention is related to a transmission device for transforming an alternate rotation movement from a motor into a reciprocating movement in a resuscitation device by means of rotation connections.

BACKGROUND

The invention comprises also a chest compression device incorporating such a transmission device, and a system for transforming electrical energy into a reciprocating movement by means of rotating connections as opposed to gliding connections.

Some resuscitation devices comprise means for applying a reciprocating force on a patient's chest. These devices comprise normally a piston member which performs the reciprocating movement and a transmission system for mechanical connection of the piston member to an actuating mechanism. The reciprocating movement must take place with definite frequency and force, the frequency lying in the range of 13 Hz and the force lying in the range of 0-600N. These values lead to requirements regarding regulation systems, precision, manipulation of mechanical stress, etc. Prior art transmission systems comprising equipment adapted to meet these requirements are quite voluminous. Besides, said transmission systems are not satisfactorily efficient, since friction losses related to force transmission are significant.

DETAILED DESCRIPTION

Figure 1:
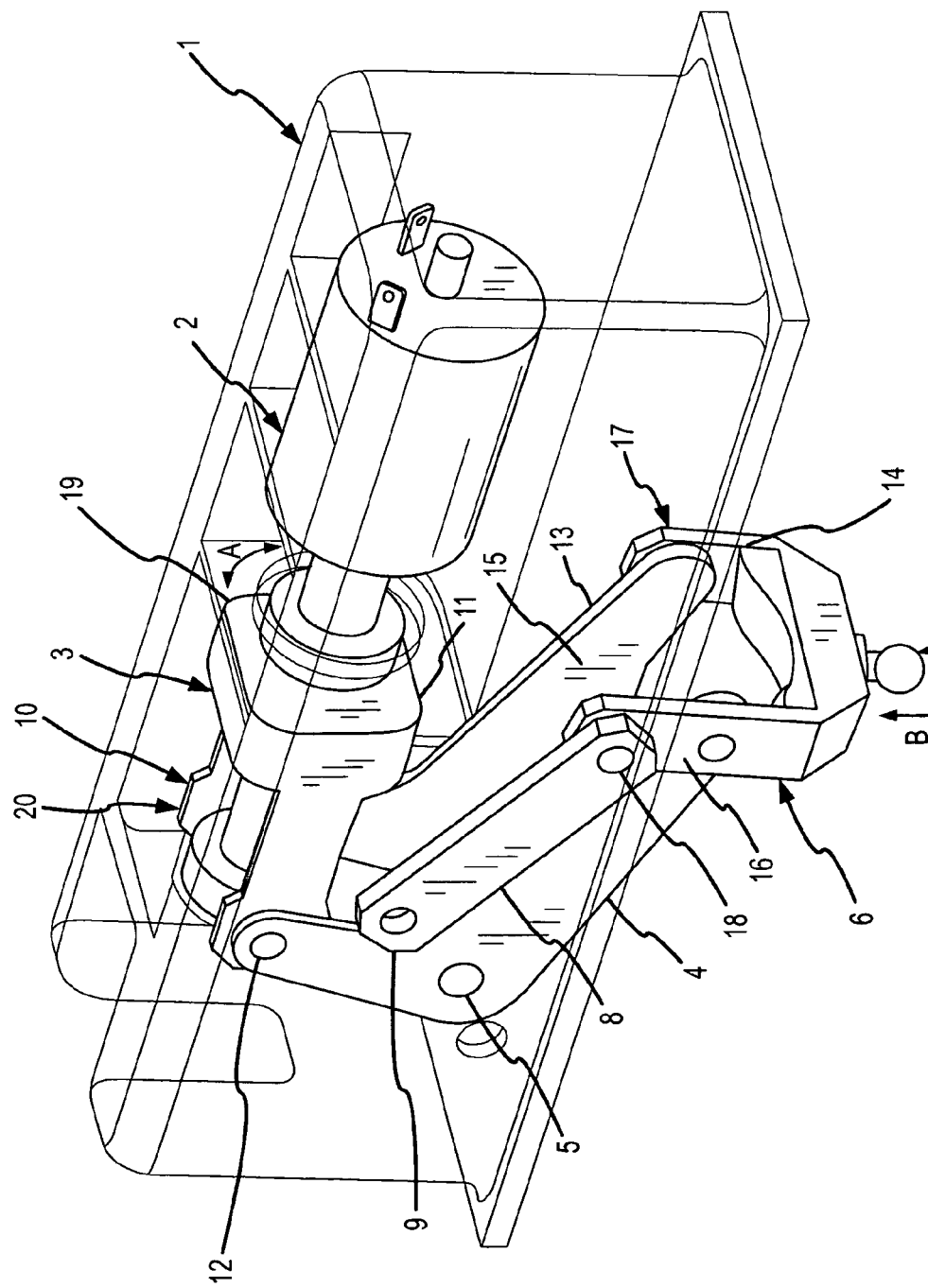
FIG. 1 is an isometric view of one embodiment of the invention, where a ball member is in its lowest position.

The invention comprises a device for transforming a rotation movement into a linear reciprocating, movement comprising: a rotating element, a linear reciprocating element connected to the rotating element, a first pivoting element connected to the linear reciprocating element and having a first fixed pivot point, a second pivoting element connected to the first pivoting element and comprising a ball member, and a third pivoting element connected to the second pivoting element and having a second fixed pivot point, the transmission system transforming a rotational movement of the rotating element into a substantially reciprocating movement of the ball member.

The alternate rotating element inputs rotation energy from e.g. an electric motor, a hydraulic system or any other actuating mechanism to the system. The ball member provides a reciprocating movement which can be transferred to the patient by means of a compression member. The alternative rotating element can be connected to the motor in a torque transferring manner while rotating in one direction (the direction leading to a lowering of the ball member exercising pressure on the patient's chest) and disconnected from the motor when rotating in the other direction. In this case rotation in the other direction can be achieved by means of a spring return mechanism. The alternative rotating element can also be connected to the motor in a torque transferring manner while rotating in both directions.

In one embodiment of the invention the rotating element comprises a helical screw and in a variant of this embodiment it is a helical ball screw.

In one embodiment of the invention the linear reciprocating element comprises an annular part provided with a thread and in a variant of this the thread is a helical thread. In another embodiment of the invention the linear reciprocating element comprises two arms provided with connecting elements for rotating connection to the first pivoting element, where the term "rotating" shall be interpreted as a connection which permits limited rotation of the first pivoting element about a point in relation to the linear reciprocating element. The expression "limited rotation" or "rotation" must be interpreted in the context of the present specification as an angular movement or an angular oscillation with angles less than 360 degrees.

In one embodiment of the invention the first pivoting element comprises two parallel, L-shaped levers provided with connecting elements for connection to the linear reciprocating element on one end of the levers, to the second pivoting element on the opposite end of the levers and to a shaft in a first fixed pivot point in the first pivoting element. In one embodiment of the invention the levers are connected to each other by means of a web.

In one embodiment of the invention the second pivoting element comprises a U shaped two-pronged fork where both prongs are provided with connecting elements for rotating connection to the first pivoting element. In a variant of this embodiment the two prongs have different lengths, the longest prong being provided with connecting elements for rotating connection to the third pivoting element. The part of the elements connecting the two prongs comprises a ball member which will perform a substantially reciprocating movement as a consequence of the rotating movement of the motor.

The third pivoting element can comprise a single arm and said arm is provided on one end with connecting elements for rotating connection to the second pivoting element and on the other end with connecting elements for rotating connection to a shaft in a second fixed pivot point in the third pivoting element.

The invention comprises also a chest compression device comprising a transmission device as described above, a low inertia motor connected to the rotating element and a compressing member for applying compression to the patient. The low inertia motor will be advantageous because it leads to low losses and this contributes to provide a high efficiency chest compression device.

The invention comprises also a system for transforming electrical energy into a reciprocating movement comprising a low inertia motor and a transmission device as described above.

The compression member can e.g. be a plate, a round shaped body, a suction cup, etc.

Although different features of the invention are described in the present specification as belonging to different embodiments it will be clear for the skilled person that these can be combined into a single embodiment as shown in the exemplary embodiment described below.

The transmission device according to the invention has reduced volume and is thus easy to incorporate in portable equipment. It can of course also be incorporated in fixed equipment. The device provides further a satisfactory distribution of stress on most components and this has as consequence high reliability and long duration of the device.

The device according to the invention performs force transmission substantially by rotation (or angular movement) as opposite to sliding movement. This transmission leads to high efficiency since friction forces are reduced. The device is capable of absorbing vertical forces without significant losses.

FIG. 1 is an isometric view of a transmission device 1 according to one embodiment of the invention. The transmission device 1 includes an alternate rotating element 2 and a linear reciprocating element 3 connected to the rotating element 2. The transmission device also includes a first pivoting element 4 connected to the linear reciprocating element 3 and having a first fixed pivot point 5. A second pivoting element 6 is connected to the first pivoting element 4 and includes a ball member 7. A third pivoting element 8 is connected to the second pivoting element 6 and has a second fixed pivot point 9. The transmission system 1 transforms an alternating rotational movement (arrow A) of the rotating element 2 into a substantially reciprocating movement (arrow B) of the ball member 7. FIG. 1 shows the ball member 7 in its lowermost position.

In the embodiment of the invention shown in FIG. 1, the rotating element 2 comprises a helical ball screw 10. The function of the ball screw 10 is to provide a low friction connection between the alternate rotating element 2 and the linear reciprocating element 3. The linear reciprocating element 3 includes a corresponding internally threaded part containing low friction balls (not shown) for connection to the ball screw 10. In the embodiment of the invention shown in FIG. 1, a gearing connection 19 is provided between the rotating element 3 and the reciprocating element 3. The function of the gearing connection 19 is to reduce friction forces and thus wear and frictional losses.

As shown in FIG. 1, the linear reciprocating element 3 comprises two arms 20. The arms 20 comprise on one end a rotating connection to the internally threaded part in reciprocating element 3. This connection, which is implemented by openings in the arms 20 and a bolt 11, permits a limited oscillating movement.

Ends of the arms 20 opposite their connection to the threaded part in the linear reciprocating element 3 are provided with connecting parts (not shown) for connection to the first pivoting element 4. These connection parts permit rotation of the first pivoting element 4 in relation to the linear reciprocating element 3. The connecting parts in the reciprocating element 3 provide together with corresponding connecting parts of the first pivoting element 4 a rotatable joint to permit angular movement. The connecting parts are implemented as openings in the linear reciprocating element 3 and in the first pivoting element 4. The rotatable joint also includes a bolt 12 situated in openings in the linear reciprocating element 3. The bolt 12 can integrally formed with either the linear reciprocating element 3 or the first pivoting element 4, or it can be a separate component.

As will be explained in more detail below, when the alternately rotating element 2 rotates in one direction, the reciprocating element 3 moves substantially linearly, although this linear movement is accompanied by a slight rotation of the arms 20 in one direction. The linear movement of the reciprocation element 3 moves the rotatable joint with the bolt 12 in the same direction. This movement of the rotatable joint causes a pivoting movement of the first pivoting element 4 around the first fixed pivoting point 5.

In this embodiment of the invention, the first pivoting element 4 is formed by two parallel, L-shaped levers 13 provided with connecting parts for connection to the second pivoting element 6. The connecting parts permit rotation of the first pivoting element 4 in relation to the second pivoting element 6. The connecting parts are implemented as openings in the first and in the second pivoting elements 4, 6, respectively. The connecting parts also includes a bolt 14, which can be integral with one of the elements 4 or 6 or be a separate part. The L-shaped levers 13 are connected to a bolt (not shown) to provide the first fixed pivot point 5 in the first pivoting element 4. The levers 13 are connected to each other by means of a web 15.

In one embodiment of the invention, the second pivoting element 6 is formed by a U-shaped fork having two prongs 16, 17 that are pivotally connected to the first pivoting element 4. In a variant of this embodiment shown in FIG. 1, the two prongs 16, 17 have different lengths, the longest prong 16 being pivotally connected to the third pivoting element 8. These connecting parts are shown schematically as openings 18 in the third pivoting element 8, and they can include openings or a bolt (not shown), which may be integral with the second pivoting element. It is also possible for the two prongs 16 and 17 to have the same length, in which case the prong 17 would be connected to a respective arm. The ball member 7 projects downward from a web interconnecting the two prongs 16, 17. As explained above, the ball member 7 undergoes a substantially reciprocating movement as a consequence of the alternate movement of the rotating element 2. When the rotating connection implemented by the bolt 12 moves substantially linearly in one direction, the first pivoting element 4 will rotate about the fixed pivot point 5 causing displacement of the connection implemented by the bolt 14. The displacement of the bolt 14 causes the third pivoting element 8 to rotate about the fixed point 9. However, the third pivoting element 8 and the portions of the L-shaped levers 13 between the fixed pivot point 5 and the bolt 14 form opposite legs of a modified parallelogram to cause a substantially linear movement of the ball member 7.

FIGS. 2-6 show the transmission device in different stages during its motion.

Figure 2:
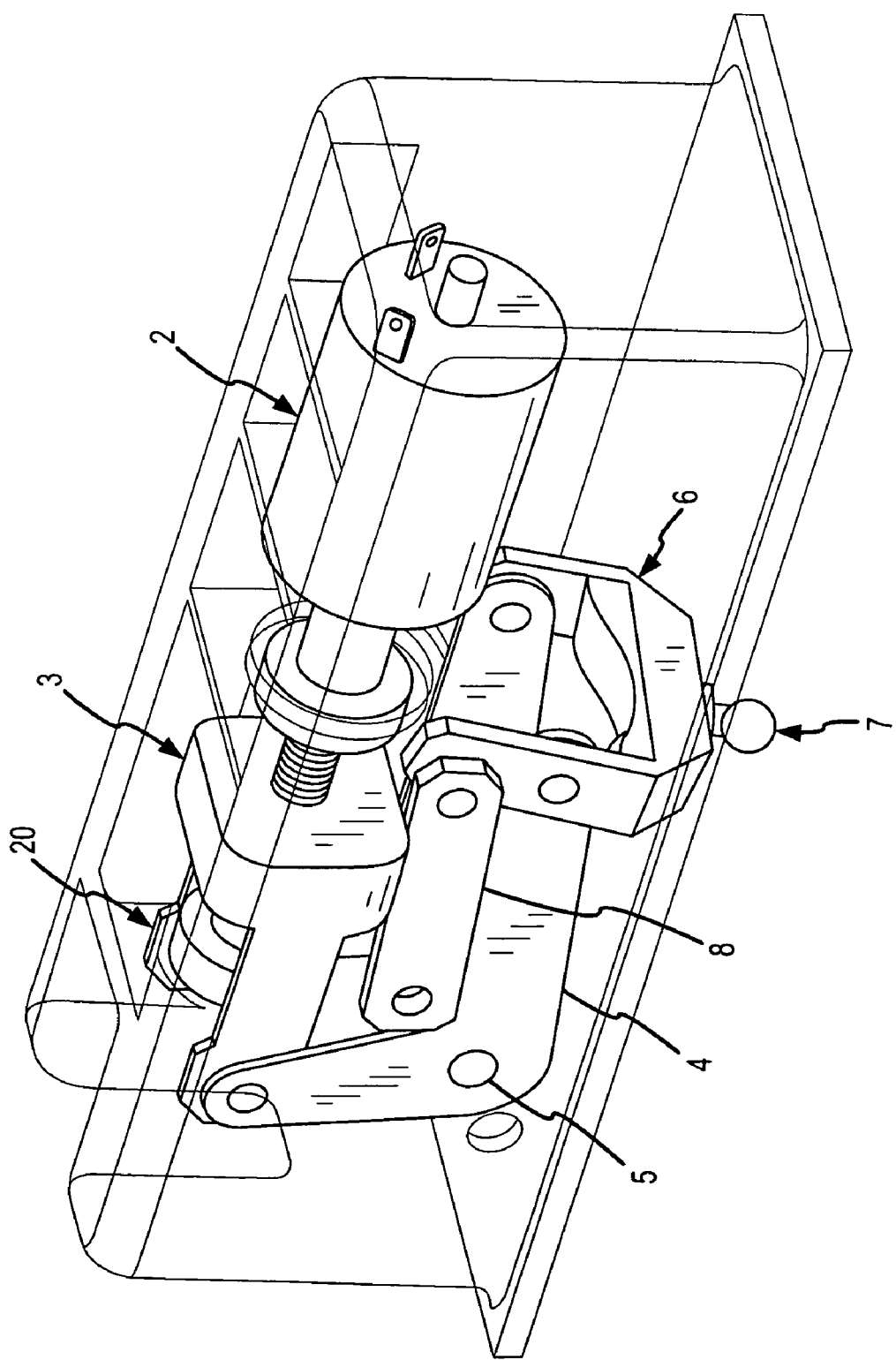
FIG. 2 is an isometric view of one embodiment of the invention, where the ball member is in a middle position.

FIG. 2 is an isometric view of the transmission device in a stage the ball member 7 is in a middle position. The rotating element 2 has rotated in relation to the position shown in FIG. 1, and the reciprocating element 3 has moved towards the left in the Figure. Consequently the arms 20 have moved to the left, and the element 4 has rotated around the first fixed point 5 thereby carrying the second pivoting element 6 with ball member 7 up. The second pivoting element 6 is limited in it rotation by the third pivoting element 8.

Figure 3:
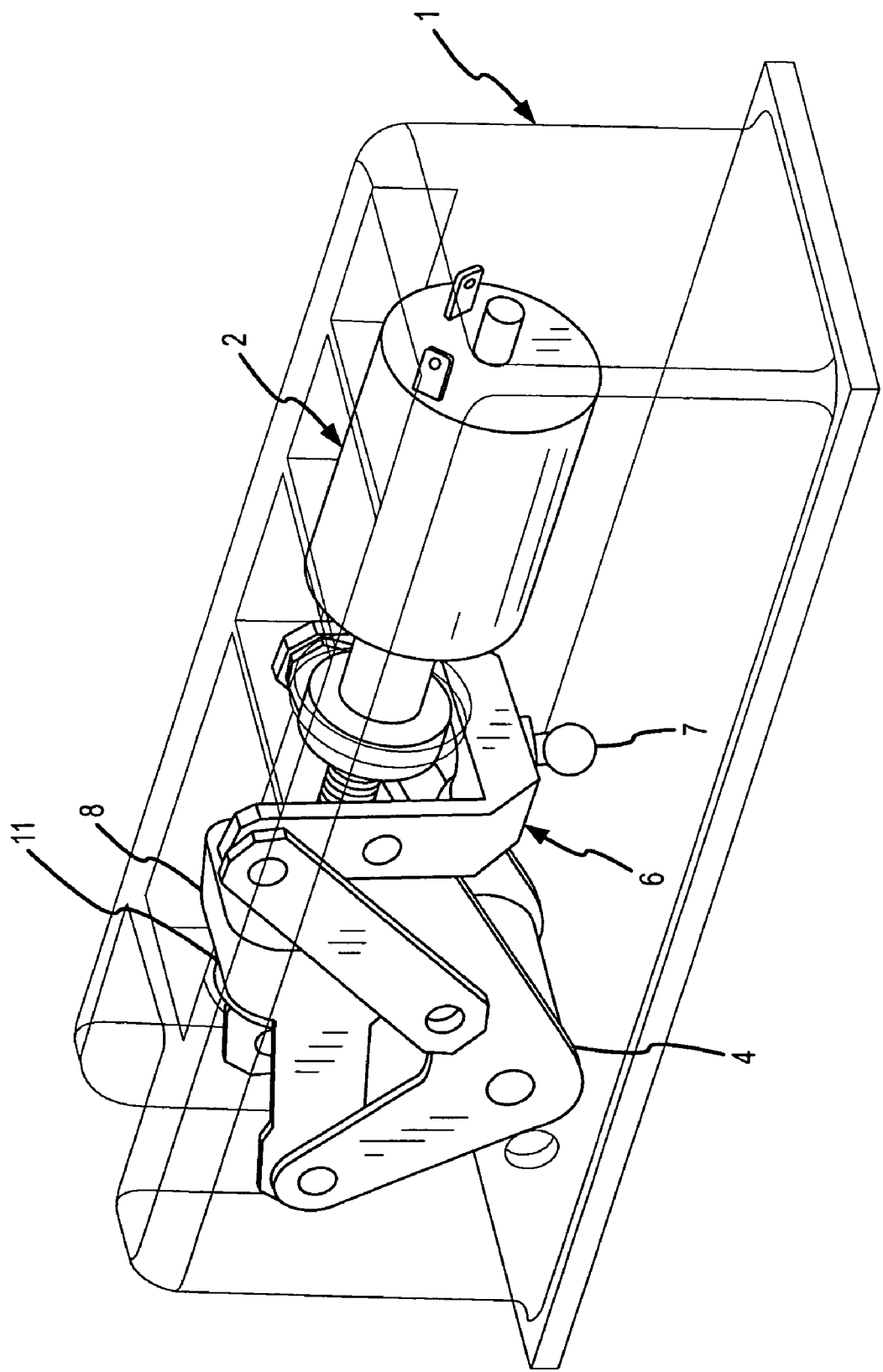
FIG. 3 is an isometric view of one embodiment of the invention, where the ball member is in its highest position.
Figure 4:
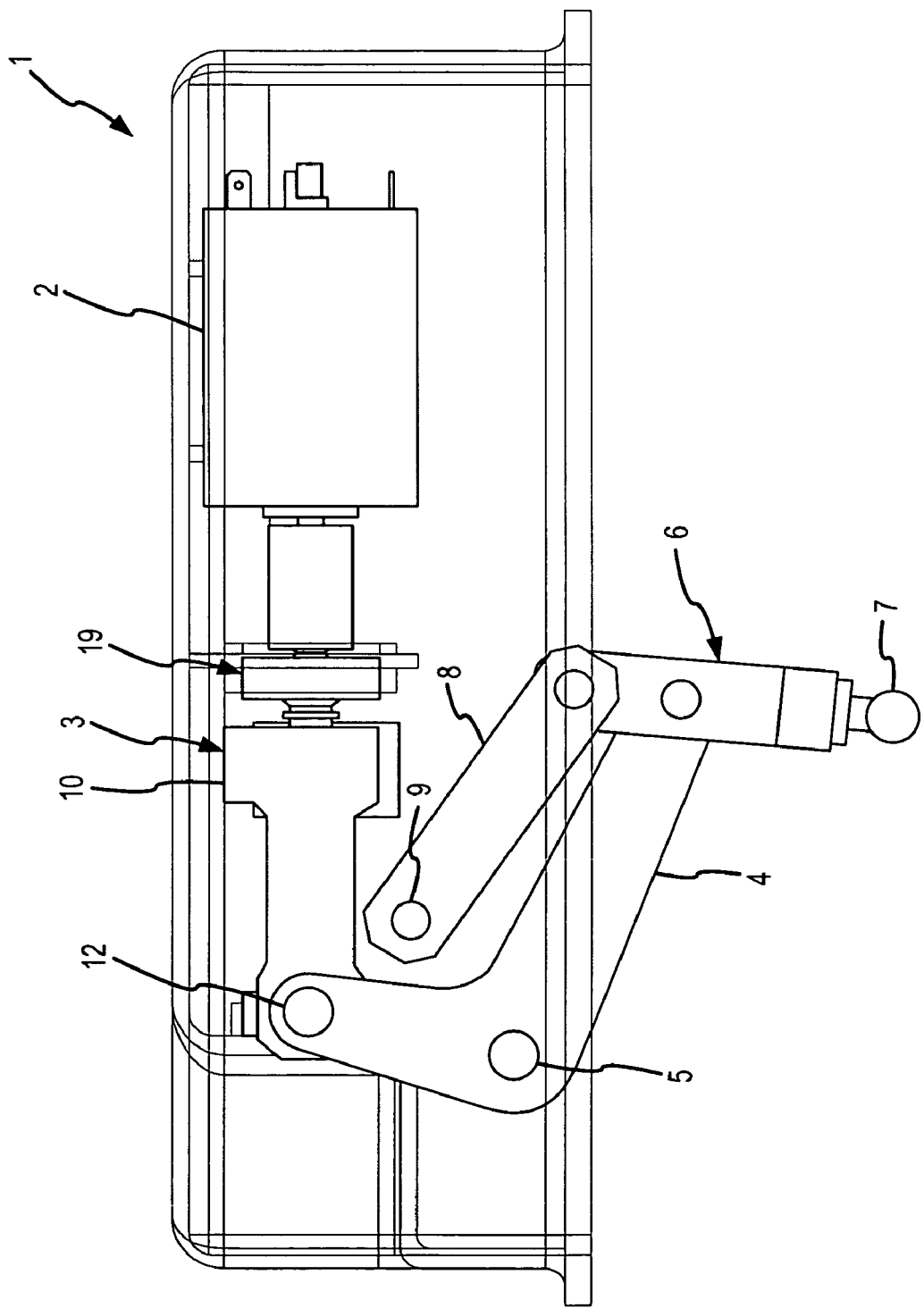
FIG. 4 is a side elevational view of one embodiment of the invention, and corresponds to FIG. 1.
Figure 5:
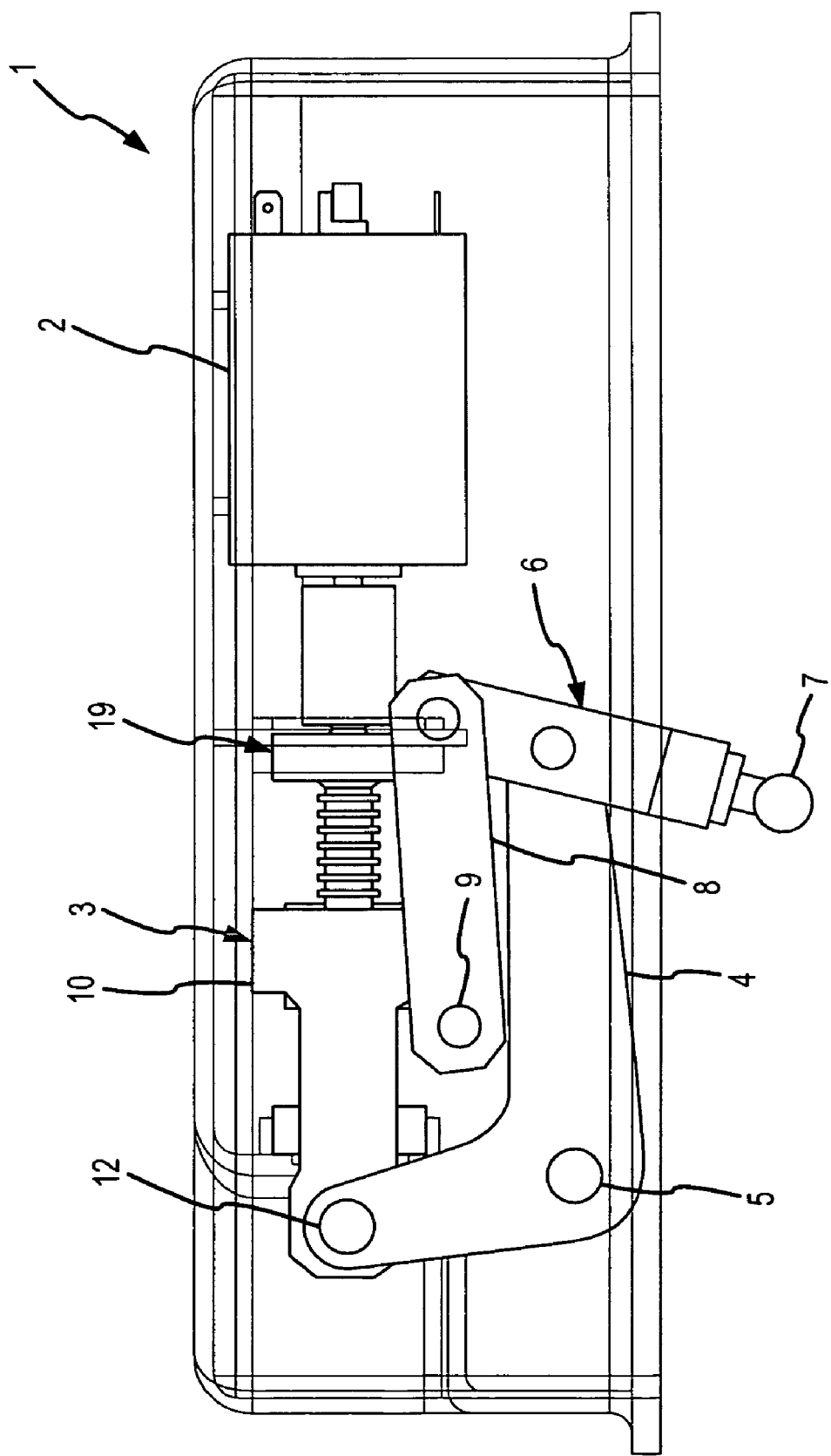
FIG. 5 is a side elevational view of one embodiment of the invention, and corresponds to FIG. 2.
Figure 6:
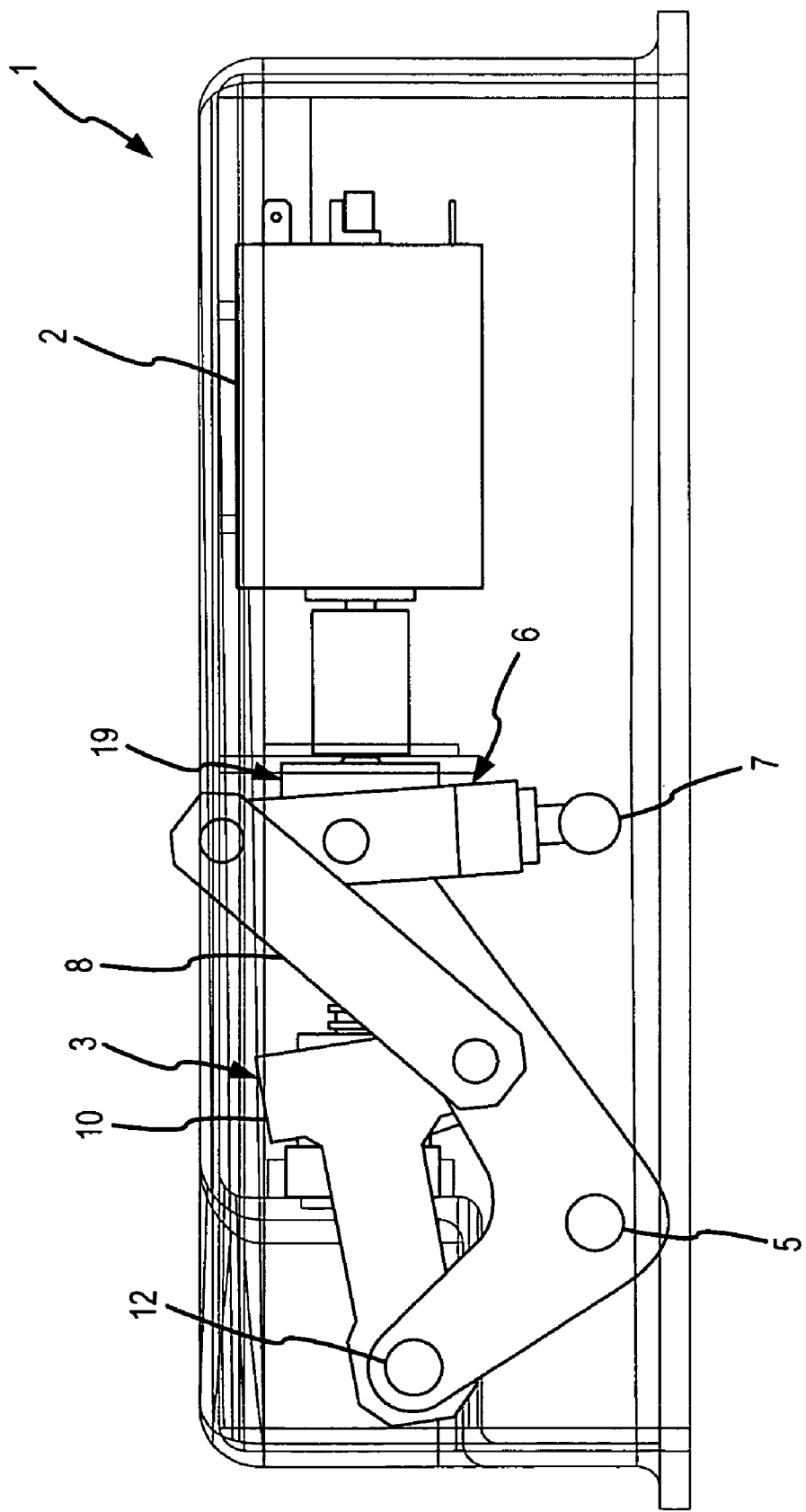
FIG. 6 is a side elevational view of one embodiment of the invention, and corresponds to FIG. 3.

FIG. 3 shows the reciprocating element 3 in its position furthest from the alternating rotating element 2. The arms 20 are shown in a slight inclined position with respect to a horizontal direction, this being possible by their pivotal connection to the internally threaded part through the bolt 11. One end of the first pivoting element 4 has reached its highest position, and so has the second pivoting element 6 with the ball member 7. One end of the third pivoting element 8 has also reached its highest position.

After the rotating element 2 has reached the position shown in FIG. 3, the rotating element 2 starts to rotate in the opposite direction. The previously mentioned steps are then repeated in the opposite direction. It is also possible to implement the invention in such a way that the rotating element 2 only is connected to the motor for providing movement of the ball member from an upper position (FIG. 3) to a lower position (FIG. 2 and FIG. 1) while the opposite movement is performed by a spring return mechanism (not shown) with the second rotating element decoupled from the motor.

Figure 7:
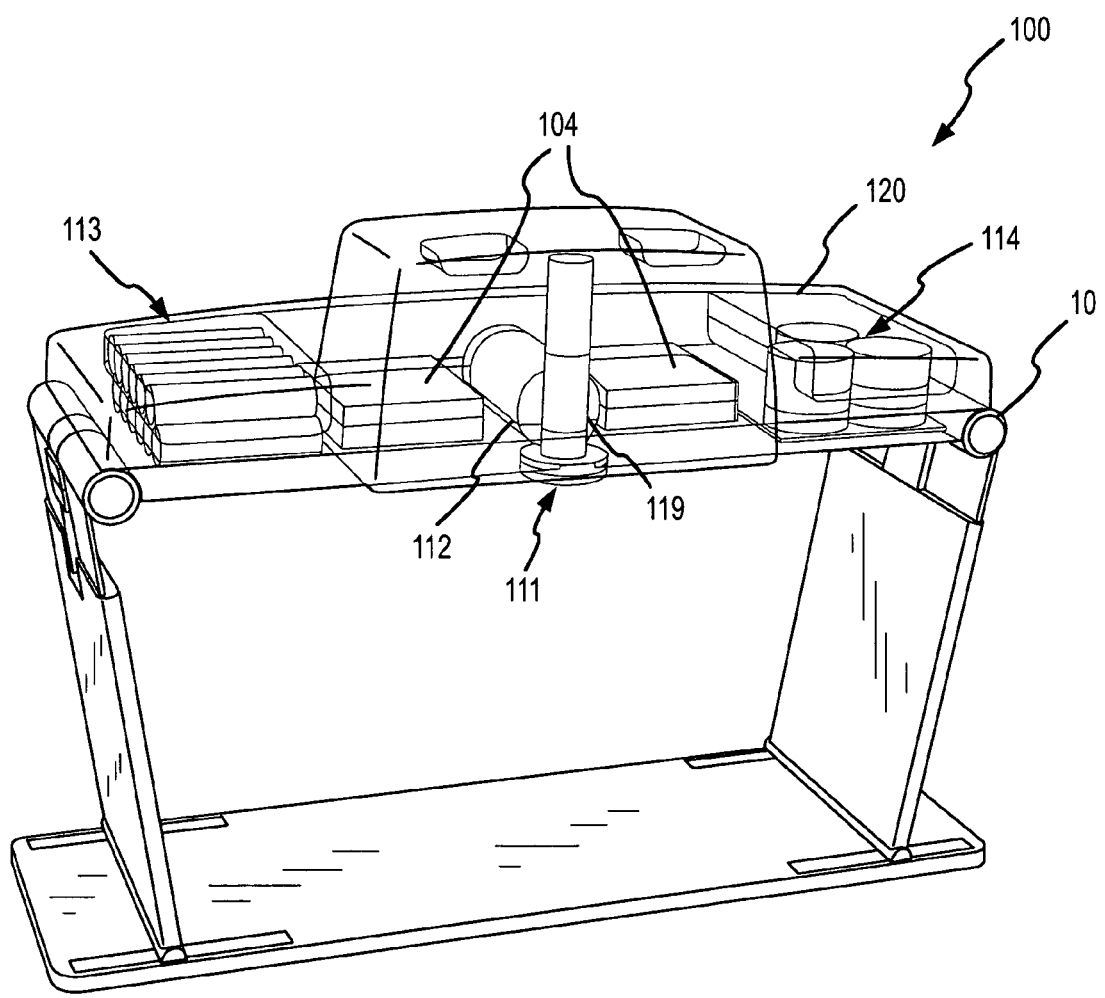
FIG. 7 is an isometric view of a chest compression device using the transmission device according to various embodiments of the invention.

The transmission device described above may be used in a chest compression device for performing cardio pulmonary resuscitation ("CPR"). An example of a chest compression device 100 is shown in FIG. 7. The chest compression device 100 includes a signal processor 104 and a power supply 120 mounted on a transverse plate 10. The chest compression device 100 also includes a piston 111, a motor 112, and a transmission mechanism 119, which may be a transmission device according to one of the embodiments of the invention. The transmission mechanism 119 transmits energy from the motor 112 to the piston 111. The motor 112 receives power from power supply 120, which may be composed of batteries 113, for example Lithium-ion chemistry type batteries, and boost electronics 114. The power supply 120 may alternatively be a device for connection to power sources in an ambulance, in a hospital, or in an external power storage device such as a battery or capacitor, or any other available power supply device. Power adapters/converters may also be used to convert power from the power supplies to different characteristics/properties such as different voltage, frequency, etc.

The piston 111 is driven by the motor 112 through the transmission mechanism 119 to reciprocate up and down to alternately compress and allow decompression of the patient's chest. The boost electronics provides a high energy, short pulse to the power input of the motor 112.

The signal processor 114 controls operation of the chest compression device based on predetermined characteristics and/or on characteristics measured by measuring devices, such as the measuring device 113. The control signals may for example be based on patient characteristics, such as a measured chest height/depth of the patient, age of the patient, ECG measurements, etc. In this way the resuscitation system may use a pulse pattern particularly adapted to the specific patient. Control signals provided by the signal processor 114 to control the actuation of the chest compression device 100 may be signals for controlling the motor 112, such as start/stop signals and/or signals controlling e.g. depth/force/frequency of the compressions.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A transmission device for transforming an alternate rotational movement into a substantially linear reciprocating movement, comprising:
   a first element operable to alternately rotate in opposite first and second directions;
   a second element coupled to the first element and operable to move linearly in a first direction responsive to rotation of the first element in the first direction and to move linearly in a second direction responsive to rotation of the first element in the second direction;
   a first pivoting element having first and second legs, and having a first fixed pivot point located at a junction between the first and second legs, the first leg being pivotally connected to the second element at a location spaced from the first fixed pivot point, the first pivoting element being operable to pivot in opposite directions about the first fixed pivot point responsive to linear movement of the second element in the first and second directions, respectively;
   a second pivoting element pivotally connected to the second leg of the first pivoting element at a location spaced from the first fixed pivot point and being operable to move in opposite directions responsive to pivotal movement of the first pivoting element in opposite directions;
   a third pivoting element pivotally connected to the second pivoting element and having a second fixed pivot point about which the third pivoting element pivots; and
   a ball member secured to the second pivoting element, the ball member undergoing reciprocal movement responsive to the pivotal movement of the first pivoting element in opposite directions.

2. The transmission device of claim 1 wherein the first element comprises a helical screw.

3. The transmission device of claim 1 wherein the second element comprises two arms pivotally connected to the first pivoting element.

4. The transmission device of claim 1 wherein the first pivoting element comprises two parallel L-shaped levers each of which is formed by first and second legs intersecting each other at the first fixed pivot point, and wherein the transmission device further comprises a shaft extending through the levers at the first fixed pivot point, the first legs of the respective L-shaped levers being pivotally connected to the second element, and the second legs of the respective L-shaped levers being pivotally connected to the second pivoting element.

5. The transmission device of claim 4, further comprising a web interconnecting the L-shaped levers.

6. The transmission device of claim 1 wherein the second pivoting element comprises a U-shaped two-pronged fork having a pair of prongs pivotally connected to the first pivoting element.

7. The transmission device of claim 6 wherein the prongs have different lengths, the longest of the prongs being pivotally connected to the third pivoting element.

8. The transmission device of claim 7, further comprising an interconnecting member extending between the prongs, and where in the ball member is secured to the interconnecting member.

9. The transmission device of claim 1 wherein the third pivoting element comprises a single arm pivotally connected at one end to the second pivoting element and pivotally connected on the other end with a shaft at the second fixed pivot point.

10. The transmission device of claim 1 wherein a first side of an approximate parallelogram are formed by the portion of the first pivoting element between the first fixed pivot point and the location where the first pivoting element is connected to the second pivoting element, and a second side of an approximate parallelogram opposite the first side is formed by the third pivoting element between the second fixed pivot point and the location where the third pivoting element is connected to the second pivoting element.

11. A device for transforming an alternate rotational movement into a linear reciprocating movement, comprising: an alternately rotating element, a linear reciprocating element connected to the rotating element, a first pivoting element connected to the linear reciprocating element and having a first fixed pivot point, a second pivoting element connected to the first pivoting element and comprising a ball member, and a third pivoting element connected to the second pivoting element and having a second fixed pivot point, the device being operable to transform an alternate rotational movement of the rotating element into a substantially reciprocating movement of the ball member.

12. The device of claim 11 wherein the rotating element comprises a helical screw.

13. The device of claim 11 wherein the linear reciprocating element comprises two arms provided with connecting elements for rotating connection to the first pivoting element.

14. The device of claim 11 wherein the first pivoting element comprises two parallel, L-shaped levers provided with connecting elements for connection to the linear reciprocating element on one end of the levers, connecting elements for connection to the second pivoting element on the opposite end of the levers and connecting elements for connection to a shaft in a first fixed pivot point in the first pivoting element.

15. The device of claim 14 wherein the levers are connected to each other by means of a web.

16. The device of claim 11 wherein the second pivoting element comprises a U-shaped, two-pronged fork wherein both prongs are provided with connecting elements for rotating connection to the first pivoting element.

17. The device of claim 16 wherein the two prongs have different lengths, the prong having the longest length being provided with connecting elements for rotating connection to the third pivoting element.

18. The device of claim 16 wherein the part of the second pivoting element connecting the two prongs comprises a ball member.

19. The device of claim 11 wherein the third pivoting element comprises a single arm provided on one end with connecting elements for rotating connection to the second pivoting element and on the other end with connecting elements for rotating connection to a shaft in a second fixed pivot point in the third pivoting element.

20. A chest compression device, comprising:
a motor having an output shaft:
a piston mounted for contact with the chest of a patient that is to receive CPR; and
a transmission device coupling the piston to the motor to convert rotational movement of the output shaft of the motor to linear reciprocating movement of the piston, the transmission device comprising:
a first element coupled to the output shaft of the motor and operable to alternately rotate in opposite first and second directions;
a second element coupled to the first element and operable to move linearly in a first direction responsive to rotation of the first element in the first direction and to move linearly in a second direction responsive to rotation of the first element in the second direction;
a first pivoting element having first and second legs, and having a first fixed pivot point located at a junction between the first and second legs, the first leg being pivotally connected to the second element at a location spaced from the first fixed pivot point, the first pivoting element being operable to pivot in opposite directions about the first fixed pivot point responsive to linear movement of the second element in the first and second directions, respectively;
a second pivoting element pivotally connected to the second leg of the first pivoting element at a location spaced from the first fixed pivot point and being operable to move in opposite directions responsive to pivotal movement of the first pivoting element in opposite directions, the second pivoting element being coupled to the piston so that the piston undergoes reciprocal movement responsive to the pivotal movement of the first pivoting element in opposite directions;
a third pivoting element pivotally connected to the second pivoting element and having a second fixed pivot point about which the third pivoting element pivots.

21. The chest compression device of claim 20 wherein the first element comprises a helical screw.

22. The chest compression device of claim 20 wherein the second element comprises two arms pivotally connected to the first pivoting element.

23. The chest compression device of claim 20 wherein the first pivoting element comprises two parallel L-shaped levers each of which is formed by first and second legs intersecting each other at the first fixed pivot point, and wherein the transmission device further comprises a shaft extending through the levers at the first fixed pivot point, the first legs of the respective L-shaped levers being pivotally connected to the second element, and the second legs of the respective L-shaped levers being pivotally connected to the second pivoting element.

24. The chest compression device of claim 23, further comprising a web interconnecting the L-shaped levers.

25. The chest compression device of claim 20 wherein the second pivoting element comprises a U-shaped two-pronged fork having a pair of prongs pivotally connected to the first pivoting element.

26. The chest compression device of claim 25 wherein the prongs have different lengths, the longest of the prongs being pivotally connected to the third pivoting element.

27. The chest compression device of claim 25, further comprising an interconnecting member extending between the prongs, and where in the piston is secured to the interconnecting member.

28. The chest compression device of claim 20 wherein the third pivoting element comprises a single arm pivotally connected at one end to the second pivoting element and pivotally connected on the other end with a shaft at the second fixed pivot point.

29. The chest compression device of claim 20 wherein a first side of an approximate parallelogram are formed by the portion of the first pivoting element between the first fixed pivot point and the location where the first pivoting element is connected to the second pivoting element, and a second side of an approximate parallelogram opposite the first side is formed by the third pivoting element between the second fixed pivot point and the location where the third pivoting element is connected to the second pivoting element.

* * * * *